United States Patent

[11] 3,585,312

[72] Inventor John T. Heizer
Haddonfield, N.J.
[21] Appl. No. 788,279
[22] Filed Dec. 31, 1968
[45] Patented June 15, 1971
[73] Assignee RCA Corporation

[54] SIGNAL TRANSMISSION IN RECORDER SYSTEMS WITH IMPEDANCE TRANSFORMATION
10 Claims, 6 Drawing Figs.

[52] U.S. Cl. .......... 179/100.2
[51] Int. Cl. .......... G11b 5/44
[50] Field of Search .......... 179/100.2, 100.2 K; 340/174.1 G; 346/74 M; 333/32

[56] References Cited
UNITED STATES PATENTS

| | | | |
|---|---|---|---|
| 1,962,227 | 6/1934 | Zepler .......... | 333/32 |
| 3,394,234 | 7/1968 | Grace .......... | 179/100.2 |

*Primary Examiner*—Terrell W. Fears
*Assistant Examiner*—Raymond F. Cardillo, Jr.
*Attorney*—Edward J. Norton

ABSTRACT: A technique for coupling high frequency energy to a recording transducer. The impedance transforming capability of a transmission line is utilized to transform the impedance of the recording transducer to a value which is matched to a source of operating signal for the transducer.

FIG. 1a.
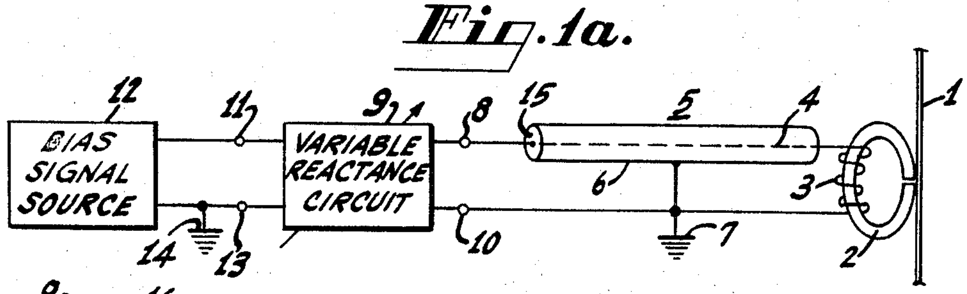
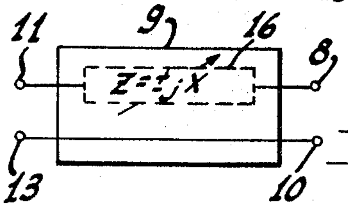
FIG. 1b. FIG. 1c.
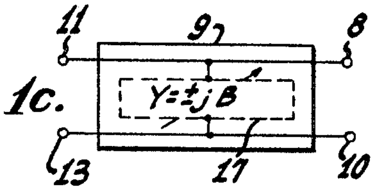
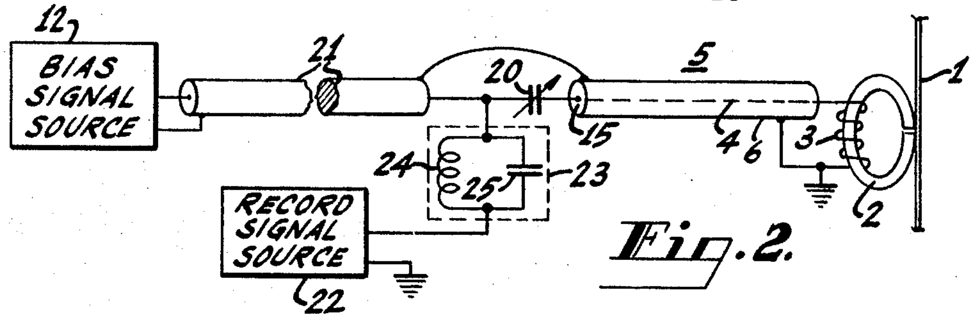
FIG. 2.
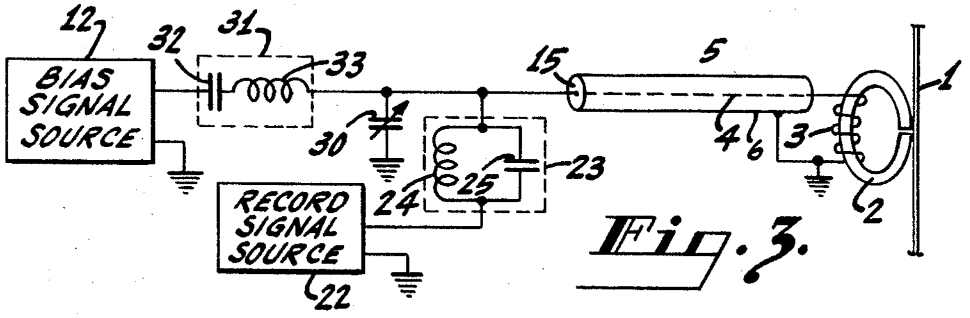
FIG. 3.
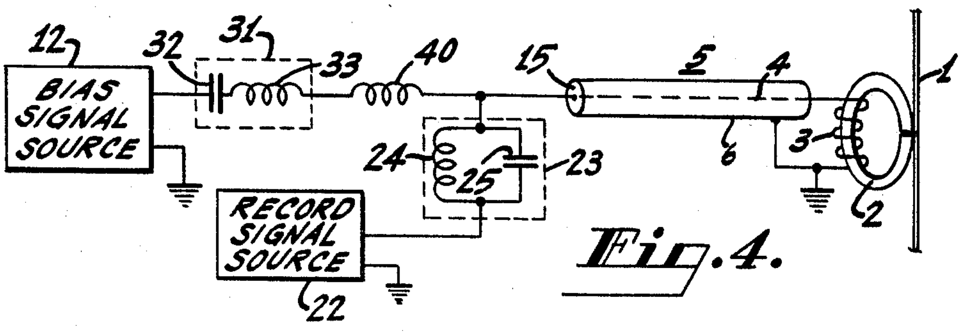
FIG. 4.
INVENTOR
JOHN T. HEIZER
BY Edward J. Norton
ATTORNEY

SIGNAL TRANSMISSION IN RECORDER SYSTEMS WITH IMPEDANCE TRANSFORMATION

The invention relates to the transmission of high frequency signals and in particular to a technique for supplying bias and record signals to a recording transducer.

In many recorder systems employing the technique of "-Direct Recording," a recording bias is utilized in recording the information signal. The bias linearizes the transfer characteristic of the recording device. In the utilization of a recording bias, the amplitude of the bias signal is made several times larger than that of the signal to be recorded. The frequency of the bias signal is also chosen to be 3 or more times the highest signal frequency to be recorded.

In many existing recorder systems, the bias signal is provided from a driver circuit, which is physically located as close as possible to the recording transducer. While this is desirable electrically, it presents mechanical arrangement and access problems in practical recorder system configurations. In addition, a bias signal which is relatively large in amplitude and frequency, must be supplied across an impedance which is usually capacitive. Providing a signal with such characteristics to a capacitive load, is usually difficult to achieve with transistor circuitry. Alternatively, impedance matching between transducer and bias signal source has been attempted by using a "pi" or "L" network. Again spatial and access problems in a practical recorder system make this approach difficult. Furthermore, practical high Q inductors for very high bias signal frequencies, would necessarily have large dimensions which is undesirable.

It is therefore an object of the present invention to provide an improved means for transmission of high frequency signals in a recorder system.

In accordance with the present invention, there is provided a recorder system of the type including a source of bias signal which presents an impedance which is substantially resistive for at least the frequency of said bias signal, and a transducer head having a winding which presents a given value of complex impedance. Transmission line means are coupled at a first end of said transducer winding. The transmission line means has a predetermined length for transforming the complex impedance from the given value to a second value at the other end of the line. The resistive component of the second value of the complex impedance, substantially matches the impedance of the bias signal source. Reactive means are coupled to the bias signal source and to the other end of the transmission line means. The reactive means has a reactance which is substantially equal and opposite to the reactive component of the second value of impedance, for neutralizing the reactive component of the second value of the complex impedance.

FIG. 1*a* is a partial schematic and partial diagrammatic view of an embodiment of the invention.

FIGS. 1*b*—*c* are a diagrammatic view of a portion of FIG. 1*a*.

FIG. 2 is a partial schematic and partial diagrammatic view of another embodiment of the invention.

FIG. 3 is a partial schematic and partial diagrammatic view of a further embodiment of the invention.

FIG. 4 is a partial schematic and partial diagrammatic view of still another embodiment of the invention.

If reference is made to FIG. 1*a*, there is shown a record medium 1 in cooperative relation with a transducer head 2. The head 2 has a winding 3, one end of which is coupled to a first end of the center conductor 4 of a coaxial line 5. The other end of the head winding 3, and the shield 6 of the coaxial line 5, are connected to a point of ground reference potential 7. The other end of center conductor 4 is connected to terminal 8 of a variable reactance circuit 9. Terminal 10 of the variable reactance circuit 9, is connected to the point of ground potential 7. Terminal 11 of variable reactance circuit 9, is coupled to a first lead of a source of bias signal 12. A second lead of the bias source 12 and terminal 13 of the reactance circuit 9, are coupled to a point of ground reference potential 14.

In the operation of the arrangement of FIG. 1, the bias signal from the source 12, which, for example, may be 100 MHz., if fed to the winding 3 of the transducer head 2. The impedance of the winding 3 is a complex impedance including a resistive and a reactive component. The winding 3 is a coil and therefore primarily presents inductive reactance to the signal fed to the head 2. However, for certain winding arrangements, the distributed capacitance of the winding 3 and the capacitance introduced by the leads required to couple to the head 2, cause the head 2 to appear as a capacitive reactance in series with a resistance.

In order to provide optimum transmission of a bias signal, with a frequency such as 100 MHz., the complex impedance of the winding 3 must be transformed to a value which can be matched to the source 12. This is accomplished by means of the coaxial line 5 and the variable reactance circuit 9. At high frequencies such as the bias signal frequency, the coaxial line 5 behaves as a transmission line. It therefore exhibits the property that an impedance, other than the lines characteristic impedance, coupled to one end of the line 5 will appear as a different value of impedance at the second end of the line 5. The value of the impedance at the second end of the line 5, depends upon the length of the line 5 in wavelengths at the signal frequency transmitted by the line 5.

Thus in accordance with the frequency of the signal from the bias source 12, the length of the line 5 is predetermined and chosen to be such that the complex impedance of the winding 3, which differs from the characteristic impedance of the line 5, will be transformed to a desired value of complex impedance at the end 15 of the line 5. The length of the line 5, is made to result in an impedance at the end 15 of the line 5, which has a resistive component which is substantially a match for the impedance of the bias source 12; the bias source 12 presenting a substantially resistive impedance at the frequency of the bias signal. The impedance at the end 15 of the line 5 also will have a reactive component of impedance. Depending upon the length of line 5, the reactive component of impedance at the end 15, will be either capacitive or inductive. The value of the variable reactance 9, is then chosen to neutralize the reactive component of the transformed impedance of the winding 3 at the end 15 of the line 5. That is, if the length of line 5 is such as to produce an inductive reactance component of impedance at the line end 15, then the variable reactance 9 is made to be capacitive, with a reactance value substantially equal to the inductive reactance at the line end 15. If the length of the line 5 is such as to produce a capacitive reactance component of impedance at the line end 15, then the variable reactance 9 is made to be an inductive reactance, substantially equal to the capacitive reactance at the line end 15. Thus the bias signal from the source 12, sees an impedance having substantially no reactive component and a resistive component which is substantially a match for the bias signal source 12.

Alternatively, the problem of providing a high frequency bias signal, such as 100 MHz., to a transducer such as the head 3, may be considered from the concept of admittance. The winding 3 therefore has a complex admittance consisting of a conductance component and a susceptance component. Again in accordance with the frequency of the bias signal, a length for the line 5 is determined which will transform the admittance of the winding 2 to a desired value at the end 15 of the line 5. For the case of admittance, the length of the line 5 will differ from that for the case of impedance. However, the length of the line 5 is determined to provide at the end 15, a conductance component of admittance which is substantially a match for the admittance of the bias source 12. The admittance presented by the bias source 12 is also made to be substantially conductive at the frequency of the bias signal. Again a reactive means is used to couple the bias source 12 to the transmission line 5 to neutralize the susceptance component of the admittance at the line end 15.

FIGS. 1*b* and 1*c*, in which like reference numerals refer to corresponding elements of FIG. 1*A*, show two methods of coupling the reactive means 9 to the bias source 12 and the line 5. For the case where the bias source 12, the transmission line 5 and winding 3 are considered as impedances, a reactive means 16 is preferably coupled serially between the line end 15 and the bias source. For the case where the bias source 12, the line 5 and winding 3 are considered as admittances, a reactive means 17 is preferably coupled across the line end 15, so as to be in parallel with the admittance at the line end 15.

If reference is made to FIG. 2, there is shown another embodiment of the present invention.

In FIG. 2 there is shown, a record medium 1 in cooperative relation with a magnetic transducer head 2. The head 2 has a winding 3 which is coupled to a first end of a transmission line 5. As shown and described with reference to FIG. 1, the transmission line 5 transforms the complex impedance of the winding 3, from its given value to a second value at the end 15 of the line 5. The length of the line 5 is made to provide a resistive component, which is substantially equal to the source impedance of the bias source 12, at the frequency of the bias signal. In FIG. 2, the length of the line 5 is such as to cause the reactive component of the transformed impedance of the winding 3 at the line end 15 to be inductive. A capacitive reactance 20, having a value substantially equal to the inductive reactance at the line end 15, is therefore coupled to the line end 15 to neutralize the inductive reactance component at the line end 15. A coaxial line 21 with a characteristic impedance value equal to the value of the resistive component of the complex impedance at the line end 15, is used to couple the capacitive reactance 20 to the source 12. Since the impedance at both ends of the line 21 are substantially equal to the characteristic impedance of the line 21, the line 21 may be of any length and the optimum match of the bias source 12 to the winding 3 is preserved. In FIG. 2, a record signal source 22 is coupled to the center conductor 4 of the transmission line 5 by means of a bias trap circuit 23. The bias trap 23 for example may consist of an inductance 24 in parallel with a capacitance 25, which is resonant at the frequency of the bias signal, which for example is 100 MHz. Thus the bias trap 23, presents a high impedance to the frequency of the signal from the bias source 12, but presents a low impedance to the lower frequency of the record signal source 22, which for example may range from 2 MHz. to 25 MHz. The capacitive reactance 20, in addition to neutralizing the inductive reactance of the line end 15, presents a high impedance to the frequency of the record signal source 22. Thus, the record signal is substantially prevented from flowing into the bias signal source 12.

If reference is made to FIG. 3, there is shown a further embodiment of the invention. In FIG. 3, there is again shown a record medium 1 in cooperative relation with a transducer head 2. The head 2 has a winding 3 coupled to one end of a transmission line 5. In the same manner as described with reference to FIGS. 1 and 2, the winding 3 has a complex admittance which is transformed by the predetermined length of line 5 to second value at the line end 15. In FIG. 3, the length of line 5 is such, as to provide a conductive component at the end 15, which is a match for the admittance of the bias source 12 at the frequency of the bias signal. In FIG. 3, the length of line 5 also produces an inductive susceptance component at the line end 15. This inductive susceptance is then neutralized by the value of a capacitive element 30, which is situated in parallel relation across the line end 15. A source of record signal 22 is coupled to the line end 15 through a bias trap circuit 23, consisting of the parallel combination of an inductance 24 and a capacitance 25. The bias trap again substantially isolates the record signal source 22 from the bias signal, by providing at resonance a high impedance to the bias signal frequency and a low impedance to the record signal frequency. In FIG. 3, the bias source 12 is coupled to the line end 15, through a record signal trap circuit 31. The trap 31 consists of a capacitance 32 and an inductance 33. The value of the elements 32 and 33 which are in series, are chosen to resonate at substantially the frequency of the bias signal. The series circuit 31 thus provides a low impedance path to the bias signal frequency, which again for example may be 100 MHz. The circuit 31 however presents a high impedance to the frequency of the record signal, which for example may range from 2 MHz. to 25 MHz. Thus, the bias signal source 12 is substantially isolated from the signal from the record signal source 22.

If reference is made to FIG. 4, there is shown a still further embodiment of the invention. Again in FIG. 4, a record medium 1 is shown in cooperative relation with a transducer head 2, which has a winding 3. The winding 3 is coupled to a first end of a transmission line 5. The other end 15 of the line 5 is coupled through an inductance 40 and a record signal trap 31 to the bias signal source 12. The record signal trap circuit 31 is again comprised of a serially connected capacitance 32 and an inductance 33. The record signal source 12 is coupled through a bias trap circuit 23 consisting of reactive elements 24 and 25 to the line end 15. In the arrangement of FIG. 4, the length of the transmission line 5 is such as to produce at its end 15, for the bias signal frequency, a transformed value of the complex impedance of winding 3, which has a resistive matching component for the bias source 12 and some capacitive reactance component. The capacitive reactance component at the line end 15, is substantially neutralized by the reactance of the inductance 40. The inductance 40 is made to have a reactance at the bias signal frequency, which is equal to the capacitive reactance of the impedance at the line end 15.

It is to be noted that the arrangements shown and described for applying the record signal to the head 2, with the accompanying arrangement of bias and record signal traps, are by way of example. Other techniques such as serially feeding the bias signal and record signal to the head 2, with appropriate placement of bias and record signal traps, may be utilized in practicing the invention.

In accordance with the above description and drawings of the invention, a system was built for supplying a bias signal of 100 MHz. to a transducer head winding, having a complex impedance value of $30-j51$ ohms. A polyfoam dielectric cable with a characteristic impedance of 75 ohms and a propagation velocity of 0.78 was used as the transmission line 5. At the bias signal frequency of 100 MHz., it was determined that a length of line 23 inches long would transform the impedance of winding 3 to a value of $50+j56$ ohms. The reactive component $+j56$ was then substantially cancelled or neutralized, by proper adjustment of a variable capacitor inserted between the bias source 12 and the transmission line 5, such as shown in the arrangement of FIG. 2. It was found that a capacitor with a range of variation between 7 and 45 picofarads was suitable. Thus the impedance of the winding, 3 looking through the capacitor and the transmission line, was substantially a resistive value of 50 ohms. An optimum transmission path for the 100 MHz. bias signal to the winding 3 was then realized, by utilizing a bias signal source whose output impedance at 100 MHz. is 50 ohms.

What I claim is:

1. In combination with a recorder system including a source of bias signal which presents an impedance which is substantially resistive for at least the frequency of said bias signal and a transducer head having a winding which presents a given value of complex impedance the improvement therewith comprising; transmission line means coupled at a first end to said transducer winding, said transmission line means having a predetermined length for transforming said complex impedance from said given value to a second value at the other end of said line, the resistive component of the second value of said complex impedance substantially matching the impedance of said bias signal source, and reactive means coupled to said bias signal source and coupled to the other end of said transmission line means, said reactive means having a reactance substantially equal and opposite to the reactive component of said second value of impedance for neutralizing the reactive component of the second value of said complex impedance.

2. The invention according to claim 1 wherein the reactive component of said second value of complex impedance is capacitive, and said reactive means is inductive.

3. The invention according to claim 1, wherein the reactive component of said second value of complex impedance is inductive, and said reactive means is capacitive.

4. In combination with a recorder system including a source of bias signal which presents an impedance which is substantially resistive for at least the frequency of said bias signal and a transducer head with a winding which presents a complex impedance, having a given value; a point of reference potential coupled to one end of said head winding, transmission line means having a center conductor and a shield, said center conductor being coupled at one end to the other end of said head winding, said shield being coupled to said point of reference potential, said transmission line having a predetermined length which at the frequency of said bias signal transforms said complex impedance from said given value to a second value having a resistive component which substantially matches the impedance of said bias signal source, and means including reactance means for coupling said bias source to the center conductcr of said transmission line, said reactive means having a reactance substantially equal and opposite to the reactive component of said second value of impedance.

5. The invention according to claim 4, wherein; said source of bias signal has first and second leads, said first lead being coupled to said point of reference potential, said second lead being coupled to one terminal of said reactive means, and a second terminal of said reactive means being coupled to the center conductor of said transmission line.

6. The invention according to claim 4, wherein; said source of bias signal has first and second leads, said first lead being coupled to said point of reference potential, said second lead being coupled to the center conductor of said transmission line and one terminal of said reactive means, and the second terminal of said reactive means being coupled to said point of reference potential.

7. The invention according to claim 4, and further including; a length of coaxial cable coupled at one end to said bias source and coupled at its other end to said reactive means, said coaxial cable having a characteristic impedance which is substantially equal to the resistive component of the second value of said complex impedance.

8. The invention according to claim 4, and further including a source of record signal coupled to said center conductor of said transmission line means.

9. The invention according to claim 8 wherein; the coupling of said record signal source to said center conductor include bias trap means which present a low impedance to the frequency of said record signal and a high impedance to the frequency of said bias signal.

10. The invention according to claim 8, wherein; said means coupling said source of bias signal to the center conductor of said transmission line includes signal trap means which present a low impedance to the frequency of said bias signal and a high impedance to the frequency of said record signal.